United States Patent
Lin

(10) Patent No.: US 11,486,797 B2
(45) Date of Patent: Nov. 1, 2022

(54) SYSTEM FOR ESTIMATING TIRE TREAD DEPTH

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 21 days.

(21) Appl. No.: 17/099,853

(22) Filed: Nov. 17, 2020

(65) Prior Publication Data

US 2022/0155181 A1    May 19, 2022

(51) Int. Cl.
   *G01M 17/02*    (2006.01)

(52) U.S. Cl.
   CPC .................................. *G01M 17/027* (2013.01)

(58) Field of Classification Search
   CPC .................................................. G01M 17/027
   See application file for complete search history.

(56) References Cited

U.S. PATENT DOCUMENTS

| | | | |
|---|---|---|---|
| 6,789,416 B1 | 9/2004 | Tracy et al. | |
| 7,942,048 B2 | 5/2011 | Pingel et al. | |
| 8,312,766 B2 | 11/2012 | Pingel | |
| 8,621,919 B2 | 1/2014 | Pingel | |
| 9,831,922 B1* | 11/2017 | Robinson | H04B 5/0043 |
| 2007/0295071 A1 | 12/2007 | Iwase et al. | |
| 2009/0320581 A1* | 12/2009 | Angell | G01B 11/22 73/146 |
| 2014/0166168 A1 | 6/2014 | Engel et al. | |
| 2014/0360256 A1 | 12/2014 | Orlewski | |
| 2017/0097223 A1* | 4/2017 | Darrer | G01B 17/02 |
| 2017/0246916 A1* | 8/2017 | Rhoades | B60C 11/246 |
| 2019/0184763 A1 | 6/2019 | Pulford et al. | |
| 2019/0184775 A1 | 6/2019 | Van Wiemeersch et al. | |
| 2019/0193479 A1 | 6/2019 | Pulford et al. | |
| 2019/0193480 A1 | 6/2019 | Pulford et al. | |
| 2019/0263198 A1 | 8/2019 | Hassani et al. | |
| 2020/0398975 A1* | 12/2020 | Toda | B60C 11/246 |
| 2021/0188016 A1* | 6/2021 | Preradovic | B60C 11/243 |

FOREIGN PATENT DOCUMENTS

WO    9610727 A1    4/1996

OTHER PUBLICATIONS

Proximity Sensing Module, Datasheet'production data, Feb. 2020, ST life.augmented.

* cited by examiner

*Primary Examiner* — Eric S. McCall
(74) *Attorney, Agent, or Firm* — Edward T. Kennedy

(57) ABSTRACT

A system is provided for estimating a tread depth of a tire supporting a vehicle. The tire includes a pair of sidewalls extending to a tread. The system includes a sensor unit, which includes a time of flight sensor. The sensor includes an emitter that emits a first pulse to an outer surface of the tread and a lens that captures the reflected first pulse. A processor measures a time from emission to capture of the first pulse, and calculates a tread surface distance from the time. The emitter emits a second pulse to a base of a tread groove and the lens captures the reflected second pulse. The processor measures a time from emission to capture of the second pulse, and calculates a reference distance from the time. The processor determines a depth of the tread from a difference between the tread surface distance and the reference distance.

19 Claims, 7 Drawing Sheets

SYSTEM FOR ESTIMATING TIRE TREAD DEPTH

FIELD OF THE INVENTION

The invention relates generally to tire monitoring. More particularly, the invention relates to systems and methods that sense a tread depth of a vehicle tire. Specifically, the invention is directed to a non-contact sensor for determining tread depth using time of flight.

BACKGROUND OF THE INVENTION

Multiple tires support a vehicle, and transmit driving and braking forces from the vehicle to the road surface. It is beneficial to periodically measure the wear of the tires, as tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably, and typically are indicated by the depth of the tire tread.

In order to inform a vehicle user of the tire wear state, tread wear indicators have been developed. Some tread wear indicators involve providing features formed in the tire tread. When the tread wears down to the same level as the indicators, the tire should be replaced. However, it may be difficult for a user to see such an indicator and/or accurately determine the tire wear state from such an indicator.

Still other indicators have been developed that involve electronic sensors which are mounted in the tire tread to measure tire wear and provide an alert or signal to the user as to the wear state of the tire. While such sensors are suitable for their intended purpose, they add to the complexity and cost of the tire, and may not function properly under all circumstances.

Yet another approach to the monitoring and/or measurement of tread wear has been to measure the tread depth of a tire mounted on a vehicle as the vehicle drives over a station and the tire passes over a sensor mounted in the station, which is known in the art as a drive over reader. While drive over readers are suitable for their intended purpose, they may be expensive and may not be readily available, as they are typically installed in specific geographic locations.

As a result, there is a need in the art for a system of estimating tire tread depth in an accurate and economical manner, which may also be performed in different vehicle locations.

SUMMARY OF THE INVENTION

According to an aspect of an exemplary embodiment of the invention, a system is provided for estimating a tread depth of a tire supporting a vehicle. The tire includes a pair of sidewalls extending to a circumferential tread. The system includes a sensor unit, which includes a non-contact time of flight sensor. The time of flight sensor includes an emitter that emits a first pulse to an outer surface of the tread, and a lens that captures the first pulse after it reflects off of the outer surface of the tread. A processor measures a time from emission of the first pulse to capture of the reflected first pulse and calculates a tread surface distance from the time from emission of the first pulse to capture of the reflected first pulse. The emitter emits a second pulse to a base of a groove formed in the tread, and the lens captures the second pulse after it reflects off of the base of the groove. The processor measures a time from emission of the second pulse to capture of the second pulse and calculates a reference distance from the time from emission of the second pulse to capture of the second pulse. The processor determines a depth of the tread from a difference between the tread surface distance and the reference distance.

According to another aspect of an exemplary embodiment of the invention, a method for estimating a tread depth of a tire supporting a vehicle includes providing a tire that includes a pair of sidewalls extending to a circumferential tread. A sensor unit is provided that includes a non-contact time of flight sensor, and the sensor emits a first pulse to an outer surface of the tread and captures the first pulse after it reflects off of the outer surface of the tread. A time from the emission of the first pulse to the capture of the reflected first pulse is measured, and a tread surface distance is calculated from the time from the emission of the first pulse to the capture of the reflected first pulse. A second pulse is emitted to a base of a groove formed in the tread with the time of flight sensor, and the second pulse is captured with the time of flight sensor after the second pulse reflects off of the base of the groove. A time from the emission of the second pulse to the capture of the second pulse is measured, and a reference distance from the time from the emission of the second pulse to the capture of the second pulse is calculated. A depth of the tread is determined from a difference between the tread surface distance and the reference distance.

BRIEF DESCRIPTION OF THE DRAWINGS

The invention will be described by way of example and with reference to the accompanying drawings, in which.

Similar numerals refer to similar parts throughout the drawings.

DEFINITIONS

Figure 1:
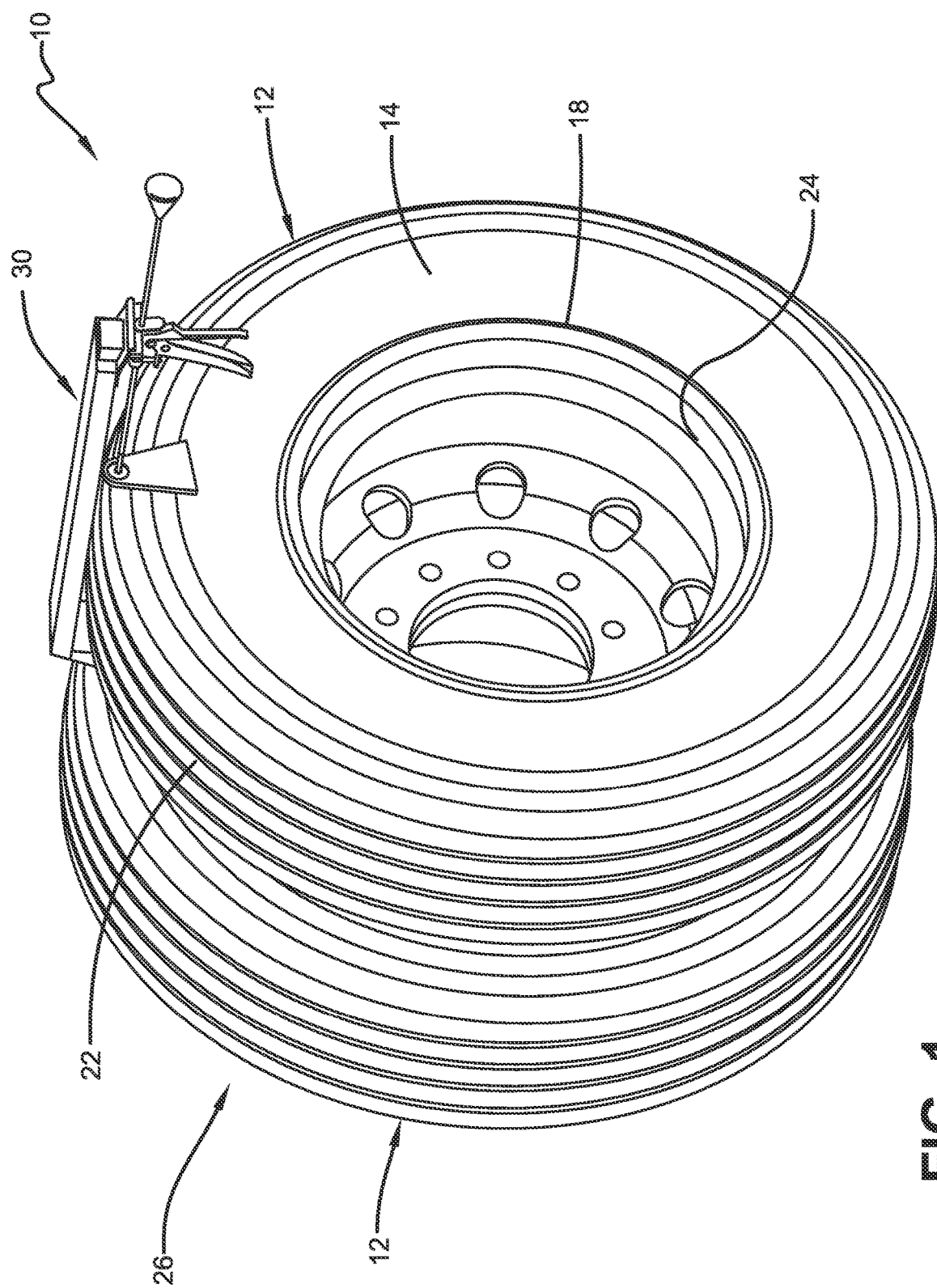
FIG. 1 is a schematic perspective view of a dual tire configuration with an exemplary embodiment of a system for estimating tire tread depth of the present invention in a first measurement configuration.

"Axial" and "axially" means lines or directions that are parallel to the axis of rotation of the tire.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint of the tire as measured under normal load and tire inflation, the lines being parallel to the equatorial centerplane.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

"Tread Arc Width" means the arc length of the tread of the tire as measured between the lateral edges of the tread.

DETAILED DESCRIPTION OF THE INVENTION

With reference to FIGS. 1 through 7, an exemplary embodiment of the system for estimating tire tread depth of the present invention is indicated at 10. The system 10 estimates the tread depth of each tire 12 supporting a vehicle, thereby indicating the tire wear state. It is to be understood that the vehicle may be any vehicle type. The tire 12 includes a pair of sidewalls including a first sidewall 14 and a second sidewall 16 extending from respective bead areas 18 and 20 to a circumferential tread 22, which wears with age from road abrasion. The tire 12 is mounted on a rim or wheel 24 in a conventional manner as known to those skilled in the art.

Figure 2:
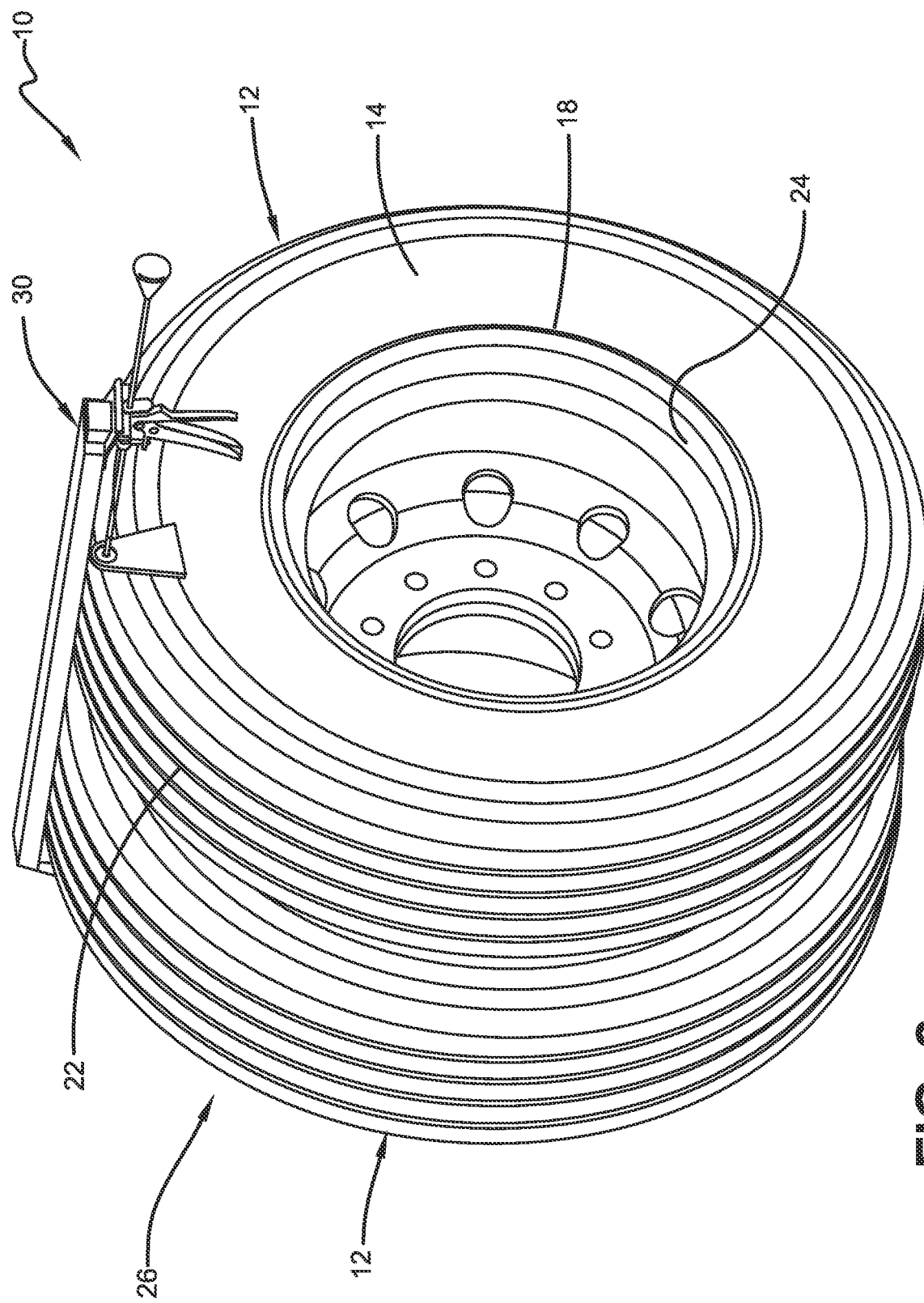
FIG. 2 is a schematic perspective view of a dual tire configuration with the exemplary embodiment of the system for estimating tire tread depth of the present invention shown in FIG. 1 in a second measurement configuration.
Figure 3:
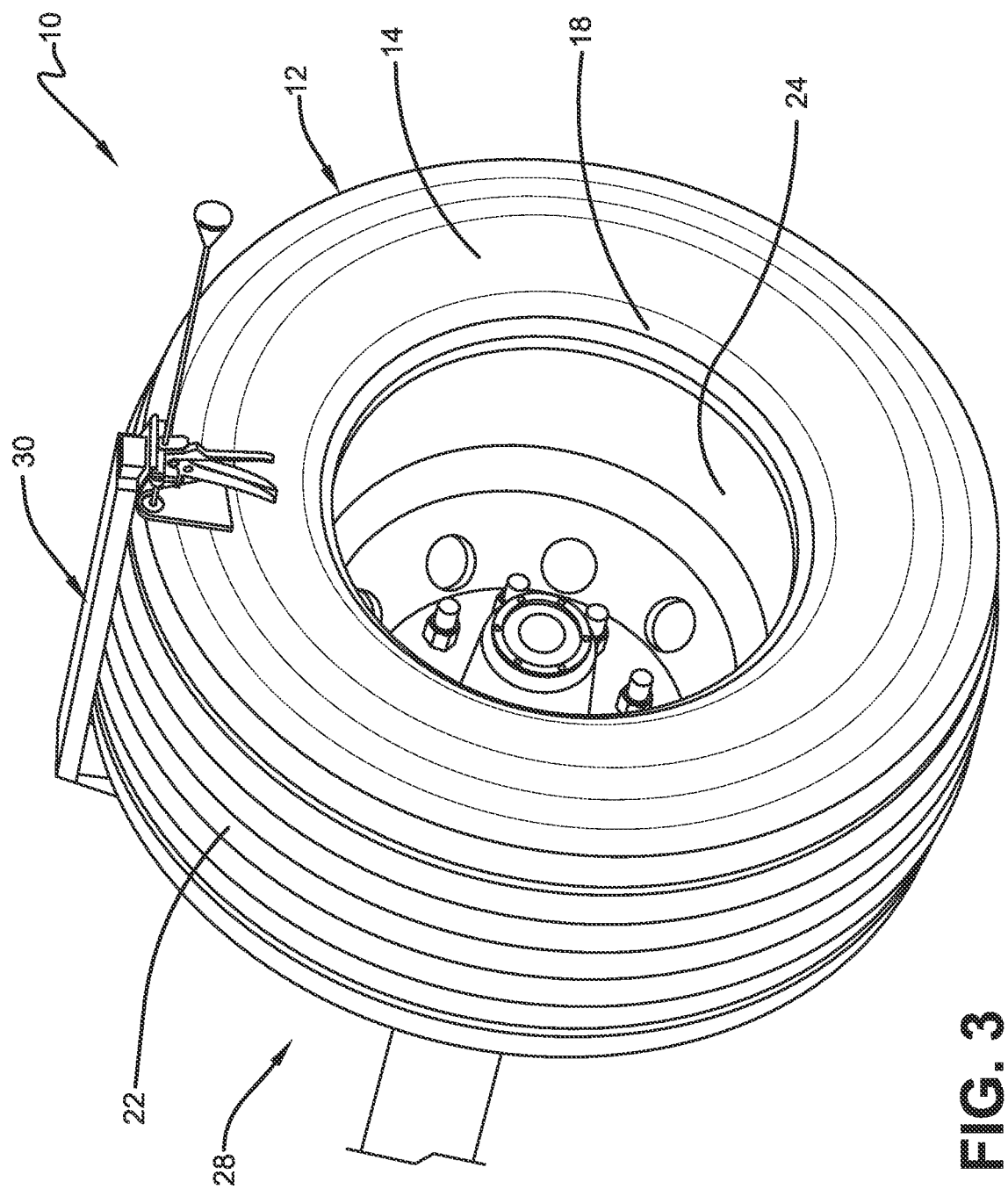
FIG. 3 is a schematic perspective view of a super single tire configuration with the exemplary embodiment of the system for estimating tire tread depth of the present invention shown in FIG. 1.
Figure 4:
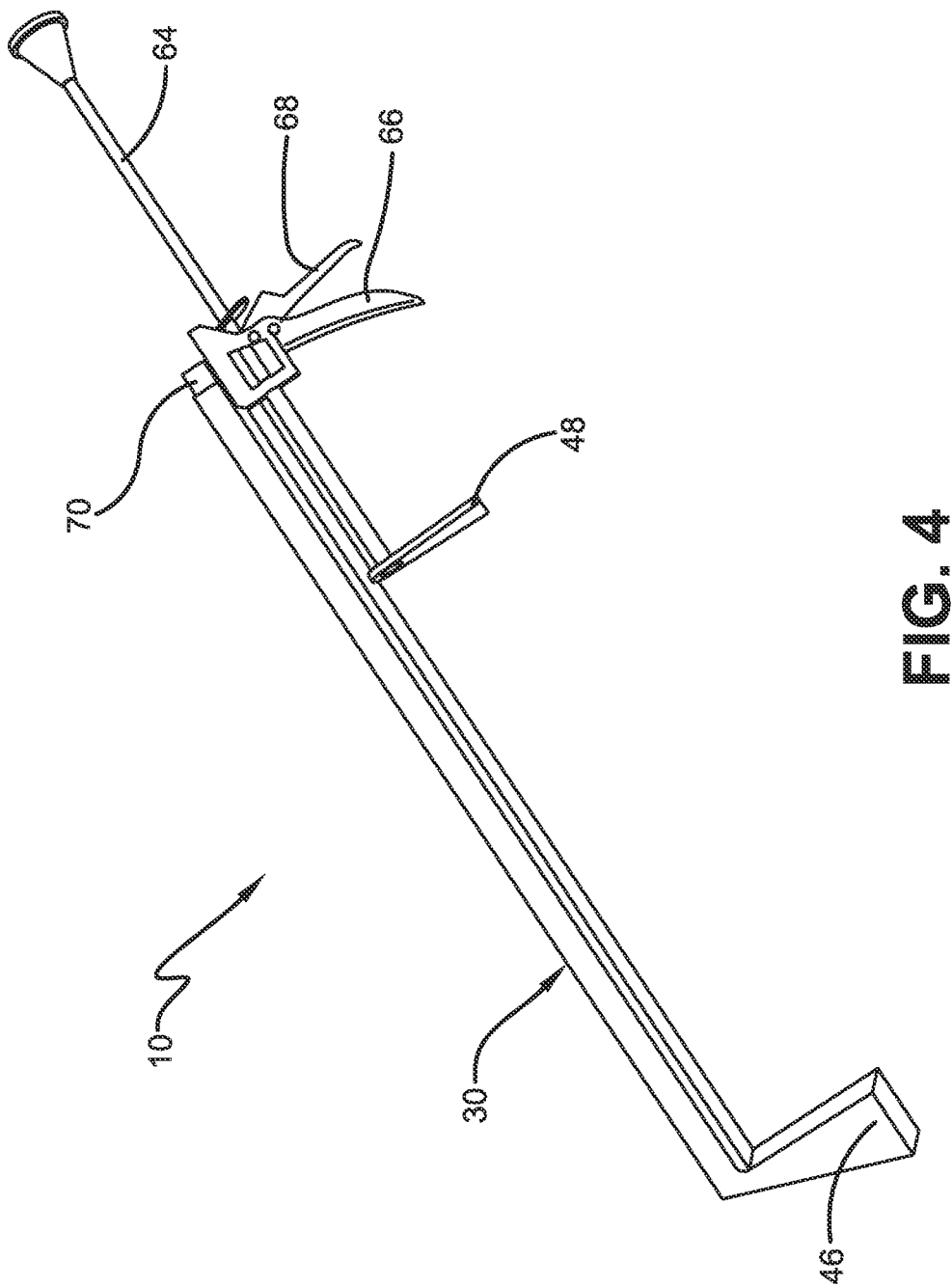
FIG. 4 is a schematic perspective view of the exemplary embodiment of the system for estimating tire tread depth of the present invention shown in FIG. 1.
Figure 5:
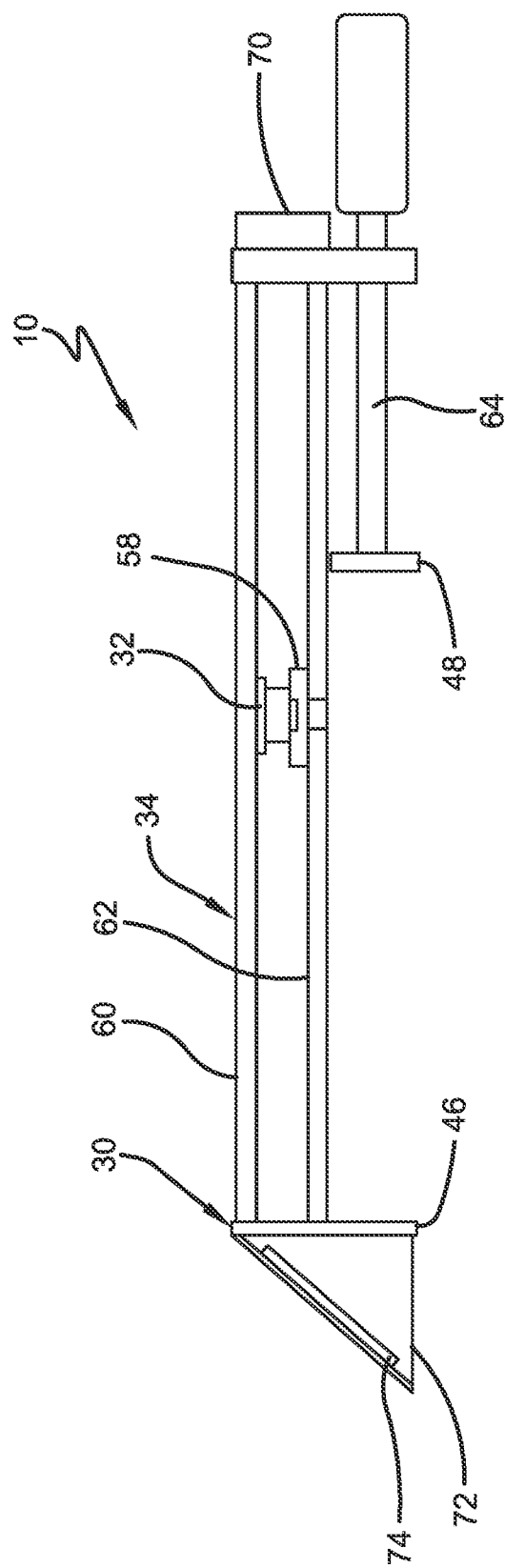
FIG. 5 is a schematic cross-sectional view of the exemplary embodiment of the system for estimating tire tread depth of the present invention shown in FIG. 4.
Figure 6:
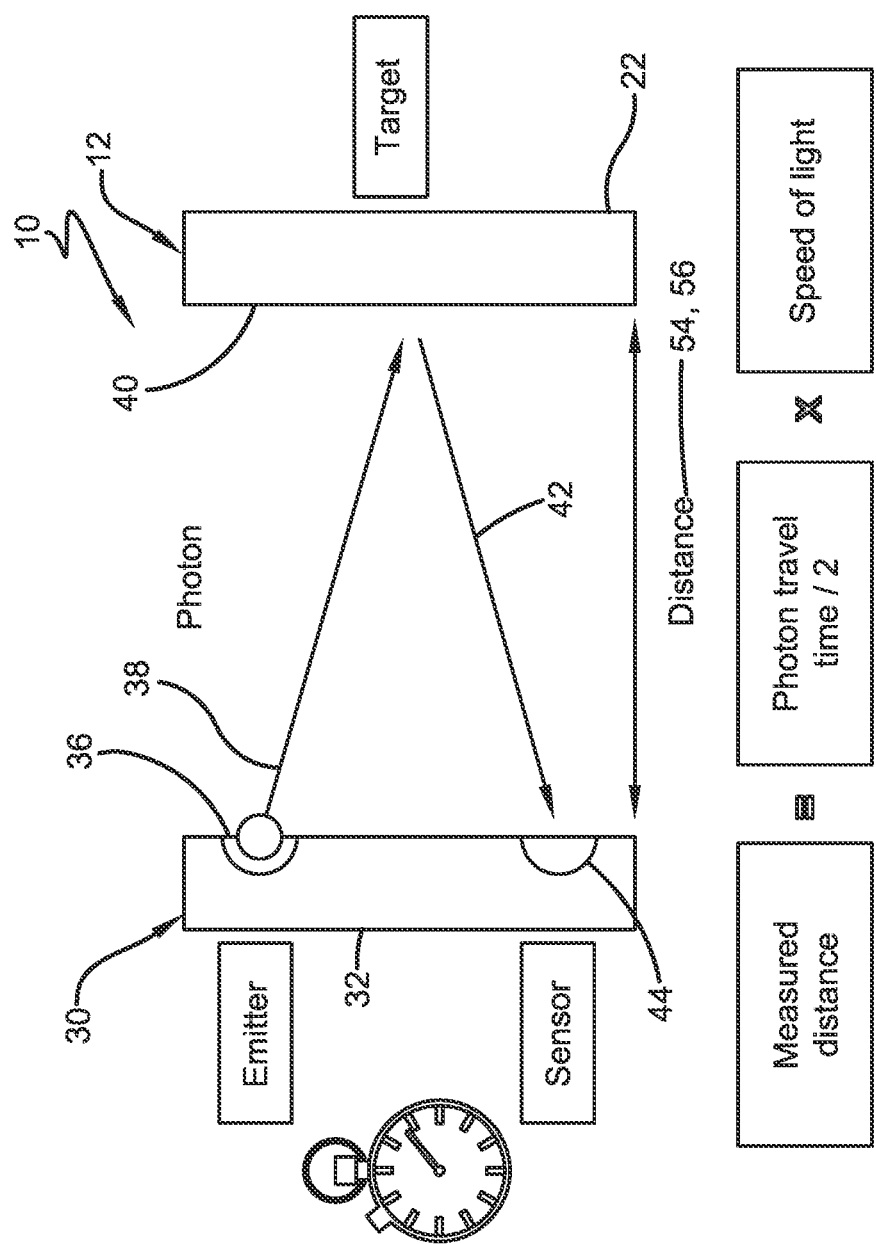
FIG. 6 is a schematic representation of the operation of a time of flight sensor of the exemplary embodiment of the system for estimating tire tread depth of the present invention shown in FIG. 1.
Figure 7:
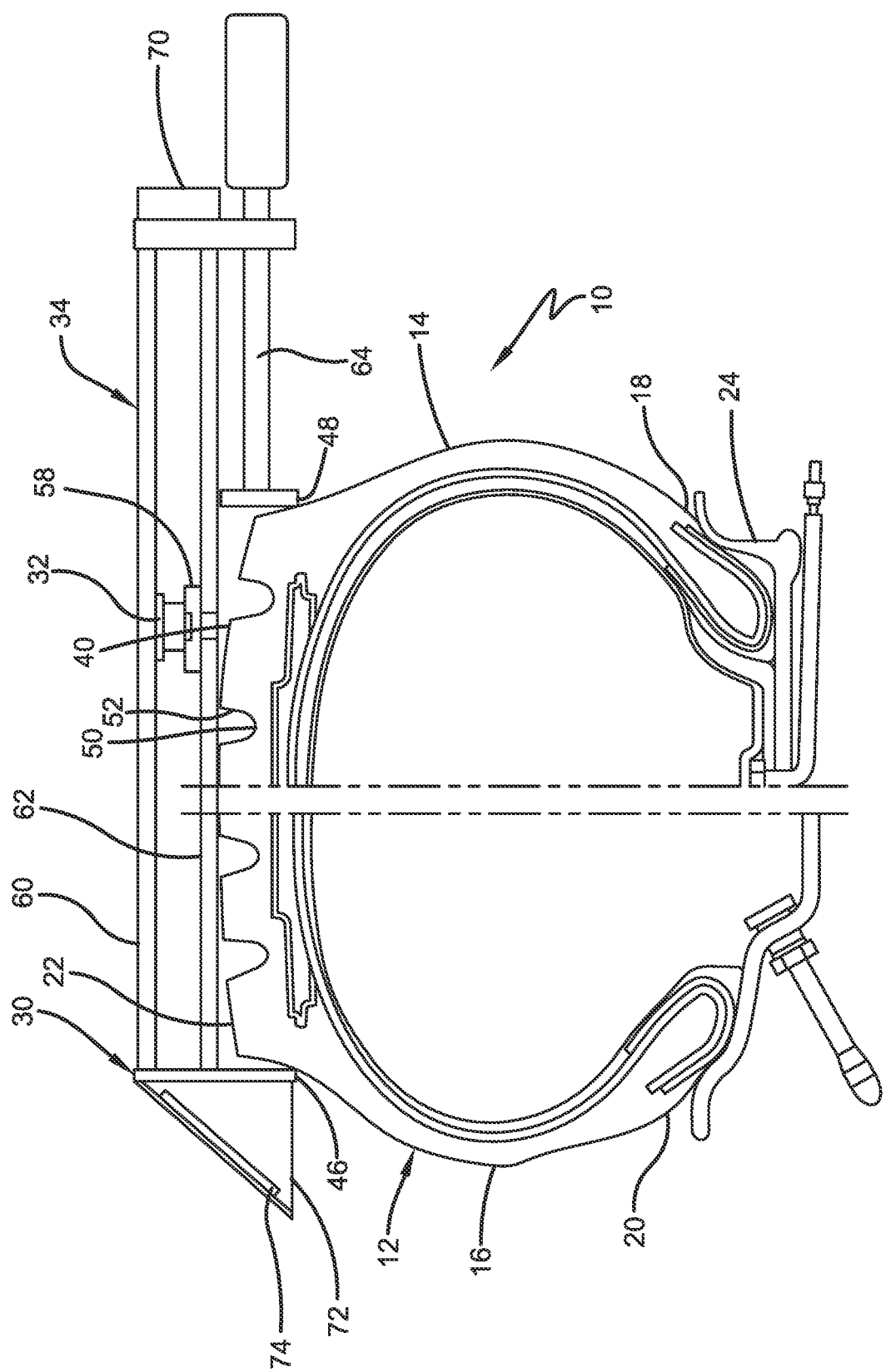
FIG. 7 is a schematic cross-sectional view of a tire with the exemplary embodiment of the system for estimating tire tread depth of the present invention shown in FIG. 5.

The system 10 includes a sensor unit 30 that measures the depth of the tread 22 of the tire 12 in any type of configuration. For example, the sensor unit 30 may measure the depth of one tire 12 in a dual tire configuration 26 as shown in FIG. 1, both tires in the dual tire configuration as shown in FIG. 2, or the tire in a single tire configuration 28 as shown in FIG. 3, including a super-single or wide tire configuration.

Referring to FIGS. 4 through 7 in particular, the sensor unit 30 includes a non-contact time of flight sensor 32 that determines the depth of the tread 22 using time of flight principles. The time of flight sensor 32 is mounted on a handheld rail system 34, which provides stable and repeatable positioning of the time of flight sensor. The time of flight sensor 32 includes an emitter 36, such as a light emitting diode (LED) or a laser diode. The emitter 36 emits a pulse 38, which preferably is a pulse of infrared (IR) light.

The emitted pulse 38 travels to the tread 22 and is reflected off of an outer surface 40 of the tread as a reflected pulse 42. The reflected pulse 42 returns to a lens 44 of the time of flight sensor 32, which collects the reflected pulse. The time of flight sensor 32 includes an internal processor 74 that measures the time from emission of the emitted pulse 38 to capture of the reflected pulse 42, which is the time of flight.

A reference distance 54 is provided between a base 50 of a predetermined groove 52 formed in the tread 22 and the time of flight sensor 32. The processor 74 of the time of flight sensor 32 calculates the reference distance 54 by measuring the time of flight of the pulse 38 and 42 between the time of flight sensor and the groove base 50. The processor 74 of the time of flight sensor 32 also calculates a distance 56 from the sensor to the tread surface 40 using the time of flight of the pulse 38 and 42 at the tread surface. Because the base 50 of the groove 52 is the last portion of the tread 22 to wear, it is a constant value, enabling the processor 74 to determine the current depth of the tread 22 from the difference between the reference distance 54 and the tread surface distance 56. The current depth of the tread 22 may then be compared to a limit value to generate a wear state of the tread.

The rail system 34 includes a distal mounting plate 46, which engages the tire 12 near the second sidewall 16, and a proximal mounting plate 48, which engages the tire near the first sidewall 14. Preferably, the proximal mounting plate 48 is axially adjustable using a guide rod 64 and handle 66 with a releasable locking lever 68. The adjustable proximal mounting plate 48 ensures secure engagement of the distal mounting plate 46 and the proximal mounting plate, and thus the rail system 34, on the tire 12. In this manner, the sensor unit 30 may be easily disposed on tires 12 of different widths and configurations 26 and 28.

The time of flight sensor 32 is preferably mounted in a sealed housing 58, which is axially moveable along rails 60 and 62. In this manner, the time of flight sensor 32 can measure the tread surface distance 56 at a single point to determine the tread wear state, and can also take distance measurements at multiple points axially along the tread 22 to generate a tread depth profile.

Based on the above-described tread depth calculation principle, the difference between the measured tread surface distance 56 and the measured groove distance 54, a full cross-section measurement of the depth of the tread 22 may be achieved by using a linear step surface distance scanning measurement. A full discrete cross-section profile of the tire 12 has been obtained and processed, based on the tread depth calculation principle, to obtain the cross-section of the depth of the tread 22 and/or the groove depth measurement 54. In a similar matter, an area of a measurement of the depth of the tread 22 may be achieved by using the time of flight sensor 32 in an array, such as a three-dimensional time of flight sensor or a time of flight camera, or a time of flight sensor with an area or two-axis scanning device.

Preferably, power is provided to the sensor unit 30 by a rechargeable battery 70, which powers the time of flight sensor 32 and drives the sensor along the rails 60 and 62. The battery 70 may be a lithium-ion battery. An end frame 72 is disposed on the distal mounting plate 46, and a wireless transmitter 74 preferably is attached to the end frame. The wireless transmitter 74 is in electronic communication with the time of flight sensor 32, and transmits data from the time of flight sensor to a remote processing unit, which may be mounted on the vehicle or may be a cloud-based unit. In this manner, the time of flight sensor 32 may take the above described time of flight measurements, which are then transmitted to a remote processing unit for determination or calculation of the reference distance 54, the tread surface distance 56, and the tread depth. Preferably, the wireless transmitter 74 is a radio frequency transmitter that employs ultra high frequency (UHF) transmission, with a signal in a range of from about 300 megahertz (MHz) to about 3 gigahertz (GHz).

Tread depth measurements may be correlated to the pressure of the tire 12, enabling the time of flight sensor 32 to also determine tire pressure. In addition, the time of flight sensor 32 may be in wireless electronic communication with a tire pressure management system (TPMS), which monitors the temperature and pressure of the tire 12. The wireless transmitter 74 may also be employed to provide power to a TPMS sensor mounted in the tire 12 through UHF wireless power transmission.

In this manner, the system for estimating tire tread depth 10 provides a non-contact sensor unit 30 including a time of flight sensor 32. The time of flight sensor 32 measures the depth of the tread 22 in a stable, accurate and reliable manner. The sensor unit 30 is a hand-held unit that enables rapid and easy placement on the tire 12, with the time of flight sensor 32 being enclosed and protected by the housing 58. The sensor unit 30 wirelessly transmits measurements from the time of flight sensor 32 to a processing unit, may be easily moved from one tire 12 to another, and easily adapts to measure tires in different wheel configurations 26 and 28.

The present invention also includes a method for estimating tread depth of a tire 12. The method includes steps in accordance with the description that is presented above and shown in FIG. 1 through 7.

It is to be understood that the steps and accompanying structure of the above described system and method for estimating tire tread depth of the present invention 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for estimating a tread depth of a tire supporting a vehicle, the tire including a pair of sidewalls extending to a circumferential tread, the system including:
   a sensor unit, the sensor unit including a non-contact time of flight sensor, the time of flight sensor including:
      an emitter, the emitter emitting a first pulse to an outer surface of the tread; and
      a lens, the lens capturing the first pulse after it reflects off of the outer surface of the tread;
   a processor, the processor measuring a time from emission of the first pulse to capture of the reflected first pulse, and calculating a tread surface distance from the time from emission of the first pulse to capture of the reflected first pulse;
   the emitter emitting a second pulse to a base of a groove formed in the tread;
   the lens capturing the second pulse after it reflects off of the base of the groove;
   the processor measuring a time from emission of the second pulse to capture of the second pulse, and calculating a reference distance from the time from emission of the second pulse to capture of the second pulse; and
   the processor determines a depth of the tread from a difference between the tread surface distance and the reference distance, and the processor correlates the depth of the tread to a pressure of the tire.

2. The system for estimating a tread depth of a tire supporting a vehicle of claim 1, wherein the time of flight sensor is mounted in a sealed housing.

3. The system for estimating a tread depth of a tire supporting a vehicle of claim 1, wherein the emitter includes at least one of a light emitting diode and a laser diode.

4. The system for estimating a tread depth of a tire supporting a vehicle of claim 1, wherein the processor is an internal processor in the time of flight sensor.

5. The system for estimating a tread depth of a tire supporting a vehicle of claim 1, wherein the processor is a processor that is remote from the time of flight sensor.

6. The system for estimating a tread depth of a tire supporting a vehicle of claim 1, wherein the time of flight sensor is in wireless electronic communication with a tire pressure management system sensor.

7. The system for estimating a tread depth of a tire supporting a vehicle of claim 6, wherein the sensor unit includes a wireless transmitter in electronic communication with the time of flight sensor, and the wireless transmitter provides power to the tire pressure management system sensor through ultra high frequency wireless power transmission.

8. The system for estimating a tread depth of a tire supporting a vehicle of claim 1, wherein the sensor unit includes a wireless transmitter in electronic communication with the time of flight sensor, the wireless transmitter transmitting data from the time of flight sensor to a remote processing unit.

9. The system for estimating a tread depth of a tire supporting a vehicle of claim 8, wherein:
   the time of flight sensor is mounted on a handheld rail system;
   the rail system includes a proximal mounting plate that engages the tire near a first one of the sidewalls, and a distal mounting plate that engages the tire near a second one of the sidewalls;
   an end frame being disposed on the distal mounting plate; and
   the wireless transmitter is attached to the end frame.

10. The system for estimating a tread depth of a tire supporting a vehicle of claim 8, wherein the wireless transmitter is a radio frequency transmitter that employs ultra high frequency transmission in a range of from about 300 megahertz to about 3 gigahertz.

11. The system for estimating a tread depth of a tire supporting a vehicle of claim 1, wherein the time of flight sensor is mounted on a handheld rail system.

12. The system for estimating a tread depth of a tire supporting a vehicle of claim 11, wherein the rail system includes a pair of rails, and the time of flight sensor is axially moveable along the pair of rails to take measurements at multiple points axially along the tread to generate a tread depth profile.

13. The system for estimating a tread depth of a tire supporting a vehicle of claim 12, wherein the sensor unit includes a rechargeable battery to power the time of flight sensor and drive the time of flight sensor along the rail system.

14. The system for estimating a tread depth of a tire supporting a vehicle of claim 12, wherein the rail system includes a proximal mounting plate that engages the tire near a first one of the sidewalls, and a distal mounting plate that engages the tire near a second one of the sidewalls.

15. The system for estimating a tread depth of a tire supporting a vehicle of claim 14, wherein the rail system includes a guide rod for axial adjustment of the proximal mounting plate.

16. The system for estimating a tread depth of a tire supporting a vehicle of claim 15, wherein the rail system includes a handle and a releasable locking lever.

17. A method for estimating a tread depth of a tire supporting a vehicle, the method including the steps of:
- providing a tire, the tire including a pair of sidewalls extending to a circumferential tread;
- providing a sensor unit that includes a non-contact time of flight sensor;
- emitting a first pulse to an outer surface of the tread with the time of flight sensor;
- capturing the first pulse with the time of flight sensor after the first pulse reflects off of the outer surface of the tread;
- measuring a time from the emission of the first pulse to the capture of the reflected first pulse;
- calculating a tread surface distance from the time from the emission of the first pulse to the capture of the reflected first pulse;
- emitting a second pulse to a base of a groove formed in the tread with the time of flight sensor;
- capturing the second pulse with the time of flight sensor after the second pulse reflects off of the base of the groove;
- measuring a time from the emission of the second pulse to the capture of the second pulse;
- calculating a reference distance from the time from the emission of the second pulse to the capture of the second pulse;
- determining a depth of the tread from a difference between the tread surface distance and the reference distance; and
- correlating the depth of the tread to a pressure of the tire.

18. The method for estimating a tread depth of a tire supporting a vehicle of claim 17, further comprising the steps of:
- mounting the time of flight sensor on a handheld rail system; and
- placing the handheld rail system in contact with the tire.

19. The method for estimating a tread depth of a tire supporting a vehicle of claim 18, further comprising the steps of:
- moving the time of flight sensor axially along the rail system; and
- taking measurements at multiple points axially along the tread to generate a tread depth profile.

* * * * *